(12) United States Patent
Mishra et al.

(10) Patent No.: US 11,678,405 B2
(45) Date of Patent: *Jun. 13, 2023

(54) 5G INTEROPERABILITY ARCHITECTURE

(71) Applicant: Parallel Wireless, Inc., Nashua, NH (US)

(72) Inventors: Rajesh Kumar Mishra, Westford, MA (US); Yang Cao, Westford, MA (US); Eugina Jordan, Leominster, MA (US); Zahid Ghadialy, Ilford (GB)

(73) Assignee: Parallel Wireless, Inc., Nashua, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/481,265

(22) Filed: Sep. 21, 2021

(65) Prior Publication Data
US 2022/0007462 A1 Jan. 6, 2022

Related U.S. Application Data

(63) Continuation of application No. 16/424,479, filed on May 28, 2019, now Pat. No. 11,129,240.

(60) Provisional application No. 62/676,906, filed on May 25, 2018.

(51) Int. Cl.
*H04W 88/16* (2009.01)
*H04W 92/02* (2009.01)

(52) U.S. Cl.
CPC ............ *H04W 88/16* (2013.01); *H04W 92/02* (2013.01)

(58) Field of Classification Search
CPC .............................. H04W 92/02; H04W 88/16
See application file for complete search history.

(56) References Cited

U.S. PATENT DOCUMENTS

| | | | | |
|---|---|---|---|---|
| 10,367,677 | B2* | 7/2019 | Parkvall | H04B 7/0617 |
| 10,630,410 | B2* | 4/2020 | Parkvall | H04L 5/0053 |
| 11,129,240 | B2* | 9/2021 | Mishra | H04W 88/16 |
| 2016/0234819 | A1* | 8/2016 | da Silva | H04L 41/5054 |
| 2017/0272330 | A1 | 9/2017 | Cao et al. | |
| 2017/0289868 | A1* | 10/2017 | Faccin | H04L 61/5007 |
| 2017/0331577 | A1* | 11/2017 | Parkvall | H04W 4/00 |

(Continued)

OTHER PUBLICATIONS

3rd Generation Partnership Project; Technical Specification Group Radio Access Network; Study on new radio access technology: Radio access architecture and interfaces (Release 14), 3GPP TR 38.801 V14.0.0 (Apr. 3, 2017).

*Primary Examiner* — Ajay Cattungal
(74) *Attorney, Agent, or Firm* — Michael Y. Saji; David W. Rouille

(57) ABSTRACT

Systems and methods are disclosed for providing a 5G interoperability architecture. In one embodiment, a system is disclosed, comprising: at least one Radio Access network (RAN); at least one core network; and a gateway in communication with the RAN and the core network, the gateway including: a Radio Access Network (RAN) interface for communicating with the at least one RAN; a core network interface for communicating with the at least one core network; and a processor configured to: process 5G signaling received from the at least one RAN on the RAN interface and provide core signaling to at least one core network; and process signaling received from the at least one core on the core network interface and provide 5G RAN signaling to at least one RAN.

18 Claims, 24 Drawing Sheets

(56) References Cited

U.S. PATENT DOCUMENTS

| | | | |
|---|---|---|---|
| 2018/0049275 A1 | 2/2018 | Agarwal et al. | |
| 2018/0063753 A1 | 3/2018 | Cao et al. | |
| 2018/0288657 A1* | 10/2018 | Stojanovski | H04W 36/0022 |
| 2019/0349848 A1* | 11/2019 | Bali | H04L 27/0006 |
| 2019/0364611 A1* | 11/2019 | Centonza | H04W 76/16 |
| 2019/0380172 A1* | 12/2019 | Xu | H04W 76/15 |
| 2020/0077405 A1* | 3/2020 | Zhang | H04L 25/0224 |

\* cited by examiner

5G INTEROPERABILITY ARCHITECTURE

CROSS-REFERENCE TO RELATED APPLICATIONS

This application is a continuation of U.S. application Ser. No. 16/424,479, filed May 28, 2019, which claims priority under 35 U.S.C. § 139(e) to U.S. Provisional Pat. App. No. 62/676,906, filed May 25, 2018, titled "5G Interoperability Architecture", each of which is hereby incorporated by reference in its entirety for all purposes. This application hereby incorporates by reference, for all purposes, each of the following U.S. Patent Application Publications in their entirety: US20170013513A1; US20170026845A1; US20170055186A1; US20170070436A1; US20170077979A1; US20170019375A1; US20170111482A1; US20170048710A1; US20170127409A1; US20170064621A1; US20170202006A1; US20170238278A1; US20170171828A1; US20170181119A1; US20170273134A1; US20170272330A1; US20170208560A1; US20170288813A1; US20170295510A1; US20170303163A1; and US20170257133A1. This application also hereby incorporates by reference U.S. Pat. No. 8,879,416, "Heterogeneous Mesh Network and Multi-RAT Node Used Therein," filed May 8, 2013; U.S. Pat. No. 9,113,352, "Heterogeneous Self-Organizing Network for Access and Backhaul," filed Sep. 14, 2013; U.S. Pat. No. 8,867,418, "Methods of Incorporating an Ad Hoc Cellular Network Into a Fixed Cellular Network," filed Feb. 18, 2014; U.S. patent application Ser. No. 14/034,915, "Dynamic Multi-Access Wireless Network Virtualization," filed Sep. 24, 2013; U.S. patent application Ser. No. 14/289,821, "Method of Connecting Security Gateway to Mesh Network," filed May 29, 2014; U.S. patent application Ser. No. 14/500,989, "Adjusting Transmit Power Across a Network," filed Sep. 29, 2014; U.S. patent application Ser. No. 14/506,587, "Multicast and Broadcast Services Over a Mesh Network," filed Oct. 3, 2014; U.S. patent application Ser. No. 14/510,074, "Parameter Optimization and Event Prediction Based on Cell Heuristics," filed Oct. 8, 2014, U.S. patent application Ser. No. 14/642,544, "Federated X2 Gateway," filed Mar. 9, 2015, and U.S. patent application Ser. No. 14/936,267, "Self-Calibrating and Self-Adjusting Network," filed Nov. 9, 2015; U.S. patent application Ser. No. 15/607,425, "End-to-End Prioritization for Mobile Base Station," filed May 26, 2017; U.S. patent application Ser. No. 15/803,737, "Traffic Shaping and End-to-End Prioritization," filed Nov. 27, 2017, each in its entirety for all purposes, having, respectively. This document also hereby incorporates by reference U.S. Pat. Nos. 9,107,092, 8,867,418, and 9,232,547 in their entirety. This document also hereby incorporates by reference U.S. patent application Ser. No. 14/822,839, U.S. patent application Ser. No. 15/828,427, U.S. Pat. App. Pub. Nos. US20170273134A1, US20170127409A1 in their entirety.

BACKGROUND 5G networks are digital cellular networks, in which the service area covered by providers is divided into a collection of small geographical areas called cells. Analog signals representing sounds and images are digitized in the phone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection.

5G uses millimeter waves which have shorter range than microwaves, therefore the cells are limited to smaller size. Millimeter wave antennas are smaller than the large antennas used in previous cellular networks. They are only a few inches (several centimeters) long. Another technique used for increasing the data rate is massive MIMO (multiple-input multiple-output). Each cell will have multiple antennas communicating with the wireless device, received by multiple antennas in the device, thus multiple bitstreams of data will be transmitted simultaneously, in parallel. In a technique called beamforming the base station computer will continuously calculate the best route for radio waves to reach each wireless device, and will organize multiple antennas to work together as phased arrays to create beams of millimeter waves to reach the device.

SUMMARY

Systems and methods are disclosed for a 5G interoperability architecture. In one example embodiment, a system is configured to provide 5G interoperability. The system includes at least one Radio Access network (RAN); at least one core network; and a gateway in communication with the RAN and the core network, the gateway including: a Radio Access Network (RAN) interface for communicating with the at least one RAN; a core network interface for communicating with the at least one core network; and a processor configured to: process 5G signaling received from the at least one RAN on the RAN interface and provide core signaling to at least one core network; and process signaling received from the at least one core on the core network interface and provide 5G RAN signaling to at least one RAN.

The gateway system may be configured wherein one of the at least one core is a 5G core, wherein one of the at least one RAN is a 5G RAN, and wherein the core signaling and the RAN signaling includes 5G user plane signaling and 5G control plane signaling.

The gateway system may be configured wherein one of the at least one core is an Evolved Packet Core (EPC), wherein one of the at least one RAN is a 5G RAN and a LTE RAN, and wherein the signaling includes user plane signaling between the EPC and the 5G RAN and wherein the signaling includes user plane signaling and control plane signaling between the EPC and the LTE RAN.

The gateway system may be configured wherein one of the at least one core is a 5G core and wherein one of the at least one RAN is at least one of a 5G RAN and an LTE RAN and wherein the signaling includes user plane signaling between the 5G core and the LTE RAN and wherein the signaling includes user plane signaling and control plane signaling between the 5G core and the 5G RAN.

The gateway system may be configured wherein one of the at least one core is a 5G core and wherein one of the at least one RAN is an LTE RAN and wherein the signaling includes user plane signaling and control plane signaling between the 5G core and the LTE RAN.

The gateway system may be configured wherein one of the at least one core is an Evolved Packet Core (EPC) core and wherein one of the at least one RAN is a 5G RAN and wherein the signaling includes user plane signaling and control plane signaling between the EPC core and the 5G RAN.

The gateway system may be configured wherein one of the at least one core is a 5G core and wherein one of the at least one RAN is at least one of a 5G RAN and an LTE RAN and wherein the signaling includes user plane signaling between the 5G core and the 5G RAN and wherein the signaling includes user plane signaling and control plane signaling between the 5G core and the LTE RAN.

The gateway system may be configured wherein one of the at least one core is an EPC core and wherein one of the at least one RAN is at least one of a 5G RAN and an LTE RAN and wherein the signaling includes user plane signaling between the EPC core and the LTE RAN and wherein the signaling includes user plane signaling and control plane signaling between the EPC core and the 5G RAN.

In another example embodiment, a method of providing 5G interoperability is presented. The method includes providing a gateway having a Radio Access Network (RAN) interface for communicating with the at least one RAN, a core network interface for communicating with the at least one core network, and a processor. The method further includes processing, by the processor, 5G signaling received from the at least one RAN on the RAN interface and providing core signaling to at least one core network. The method also includes processing, by the processor, signaling received from the at least one core on the core network interface and providing 5G RAN signaling to at least one RAN.

In another embodiment, the system is further configured to provide network slicing, enabling building of multiple logical networks for different services across any of the at least one RAN and any of the at least one core network.

DETAILED DESCRIPTION

The presently described HetNet Gateway (HNG) for 5G Interoperability Architecture can orchestrate and manage the Radio Access Network (RAN) across multiple technologies, including 3G, 4G, 5G and Wi-Fi. The HetNet Gateway is a carrier-grade, high-performance RAN orchestrator that is based on software-defined networking (SDN) and network functions virtualization (NFV), and is 100 percent compliant with all open and standard interfaces. The HNG virtualizes the RAN interfaces to manage the 5G, 4G and 3G (Long Term Evolution, or LTE, and universal mobile telecommunications system, or UMTS) RANs (HomeNodeBs/NodeBs and eNodeBs/HeNodeBs) in real-time via multi-technology self-organizing network (SON) and gateway functionality while abstracting RAN changes from the core network and the core network itself from the RAN. The HNG virtualizes thousands of base stations to look like a smaller number of virtualized cells to the core. The HNG also virtualizes radio network nodes such as Wi-Fi access points (APs), eNodeBs and NodeBs and makes them self-configurable, self-adjustable, and self-healing, helping with initial installation and ongoing maintenance. The HNG acts like a virtual radio network controller (vRNC or virtual RNC) for multi-RAT network handling resources for different technologies 3G, LTE/4G, 5G and WiFi while optimizing call processing towards radio and core network elements.

Figure 1:
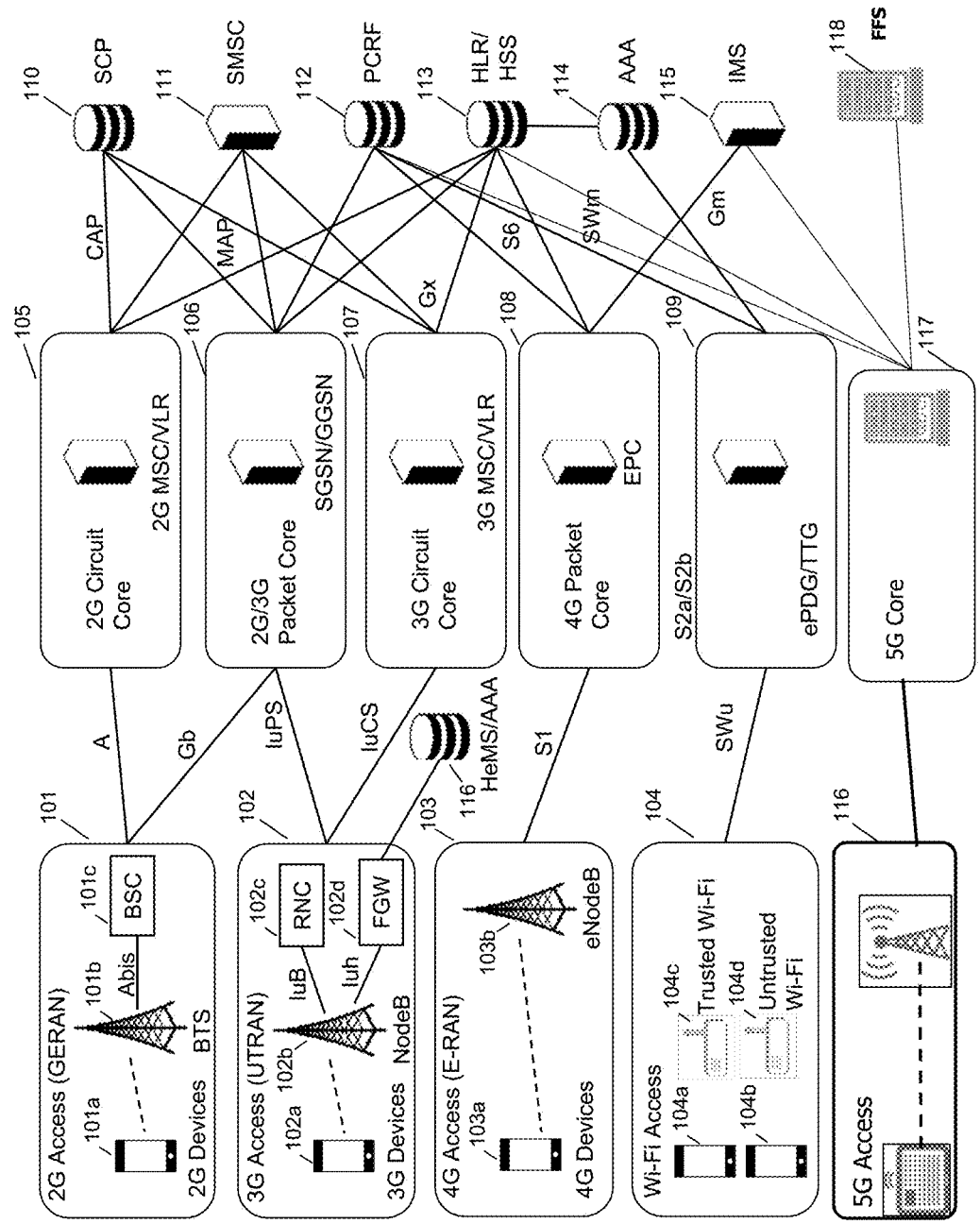
FIG. 1 is a system diagram showing different coverage scenarios, in accordance with some embodiments.

FIG. 1 is a schematic network architecture diagram for 3G and other-G prior art networks. The diagram shows a plurality of "Gs," including 2G, 3G, 4G, 5G and Wi-Fi. 2G is represented by GERAN 101, which includes a 2G device 101a, BTS 101b, and BSC 101c. 3G is represented by UTRAN 102, which includes a 3G UE 102a, nodeB 102b, RNC 102c, and femto gateway (FGW, which in 3GPP namespace is also known as a Home nodeB Gateway or HNBGW) 102d. 4G is represented by EUTRAN or E-RAN 103, which includes an LTE UE 103a and LTE eNodeB 103b. Wi-Fi is represented by Wi-Fi access network 104, which includes a trusted Wi-Fi access point 104c and an untrusted Wi-Fi access point 104d. The Wi-Fi devices 104a and 104b may access either AP 104c or 104d. In the current network architecture, each "G" has a core network. 2G circuit core network 105 includes a 2G MSC/VLR; 2G/3G packet core network 106 includes an SGSN/GGSN (for EDGE or UMTS packet traffic); 3G circuit core 107 includes a 3G MSC/VLR; 4G circuit core 108 includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP 130, the SMSC 131, PCRF 132, HLR/HSS 133, Authentication, Authorization, and Accounting server (AAA) 134, and IP Multimedia Subsystem (IMS) 135. An HeMS/AAA 136 is present in some cases for use by the 3G UTRAN. The diagram is used to indicate schematically the basic functions of each network as known to one of skill in the art, and is not intended to be exhaustive.

Noteworthy is that the RANs 101, 102, 103, 104 and 136 rely on specialized core networks 105, 106, 107, 108, 109, 137 but share essential management databases 130, 131, 132, 133, 134, 135, 138. More specifically, for the 2G GERAN, a BSC 101*c* is required for Abis compatibility with BTS 101*b*, while for the 3G UTRAN, an RNC 102*c* is required for Iub compatibility and an FGW 102*d* is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

Figure 2:
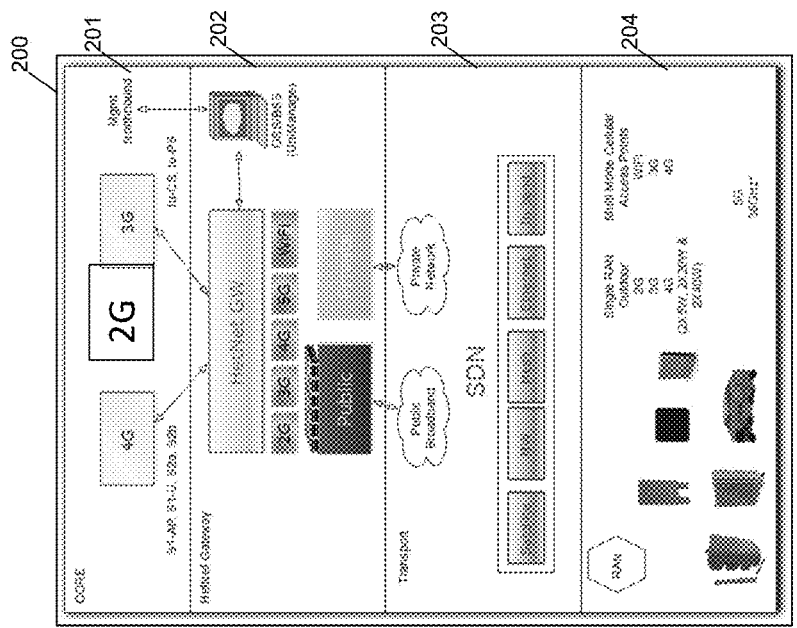
FIG. 2 is a diagram system showing 5G interoperability architecture, in accordance with some embodiments.

FIG. 2 shows an example system 200 according to one embodiment. The system 200 includes a core 201 which can include 2G, 3G and/or 4G cores. A HetNet Gateway (HNG) 202 is in communication with the core 201. The HNG 202 includes 2G, 3G, 4G, 5G and Wi-Fi support. The HNG is providing a SON for any G. Transport 203 is shown in communication with the HNG 202. The transport 203 can include public broadband and a private network. Transport 203 also includes Software Defined Network (SDN) which decouples networking hardware from networking software. Also shown are RAN 204 which includes multiple types of RANs in communication with transport 203. System 200 supports all Gs in the RAN and in the core. The system 200 also supports any backhaul and any fronthaul, as well as any SON and any network slice.

Figure 3:
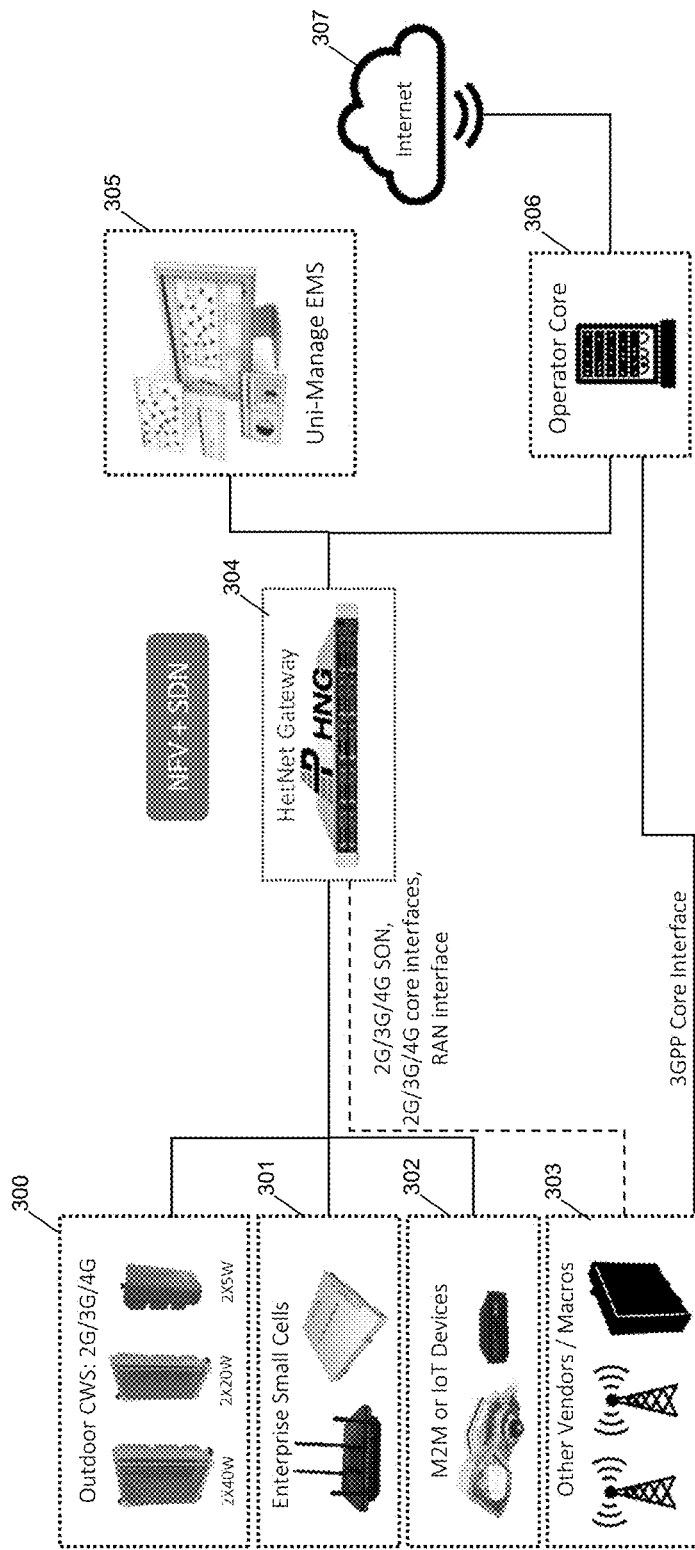
FIG. 3 is a diagram showing 2G/3G/4G indoor and outdoor solution architecture.

FIG. 3 is a block diagram of an example system. The system includes outdoor converged wireless systems 300, enterprise small cells 301, machine-to-machine (M2M) and Internet of Things (IoT) devices 302, and other vendors base stations 303. All of the systems 300, 301, 302 and 303 may support 5G. All of these devices communicate with the HNG 304 which communicates with the core 306 or Uni-manage EMS 305. The HNG is 5 G compatible with all RANs and all cores. The core 306 is in communication with the Internet 307. The HNG 304 centralizes management and control functions for all Gs. All RANs communicate through the HNG before the core. The HNG manages all RANs individually and cooperatively. The other vendors base stations 303 may connect directly to the core without going through the HNG 304.

Figure 4:
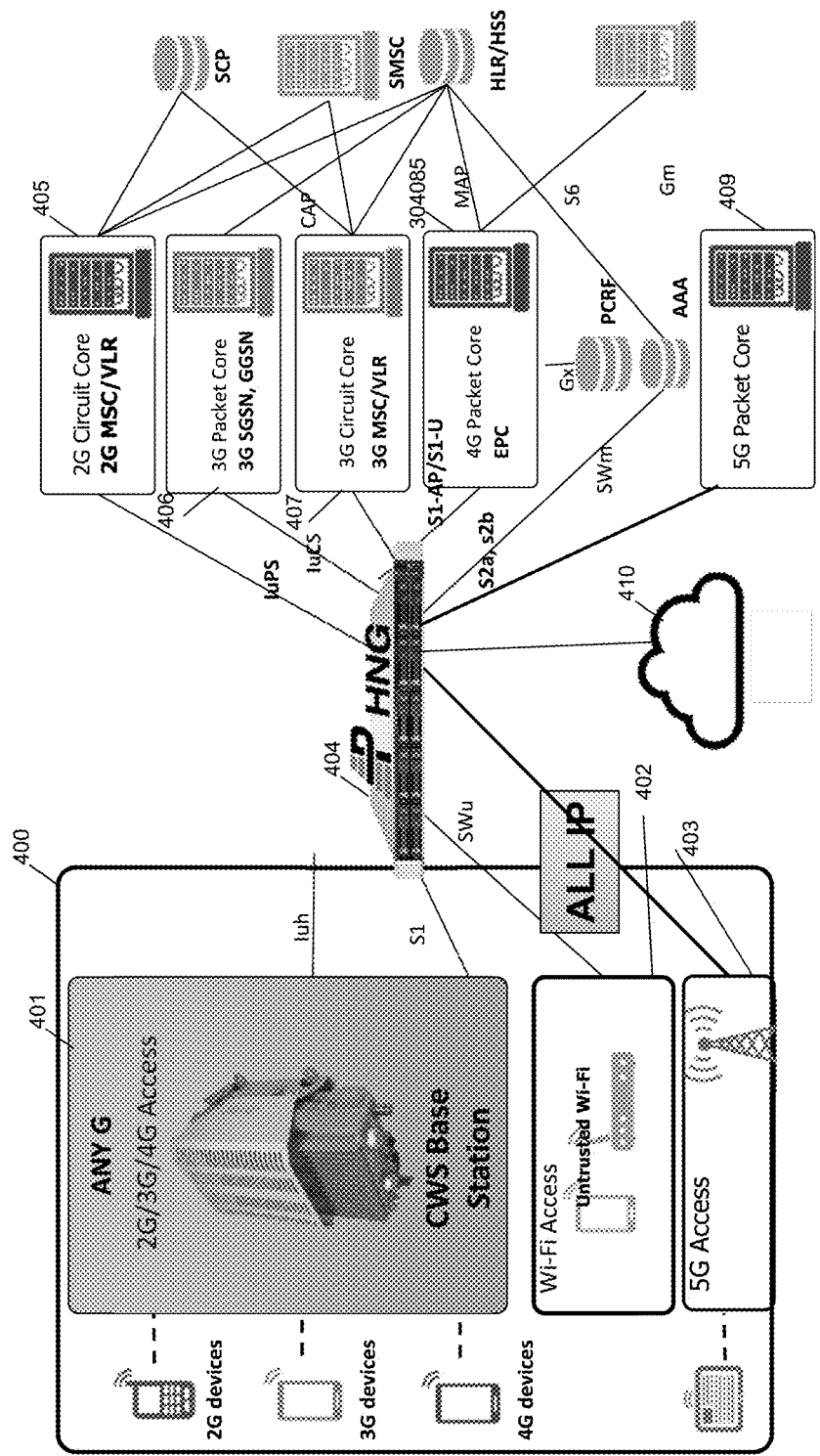
FIG. 4 is a diagram showing coverage, in accordance with some embodiments.

FIG. 4 shows a system wherein a RAN 400 can include a base station 401 for any G, a Wi-Fi access device 402 and a 5G access device 403. All the RAN devices 401, 402, and 403 communicate with the HNG 404. The HNG 404 also communicates with any core, including 2G circuit core 405, 3G packet core 406, 3G circuit core 407, 4G packet core 408 and 5G core 409. Local breakout is shown wherein the HNG 404 communicates directly with the Internet 410 without going through the core.

Figure 5:
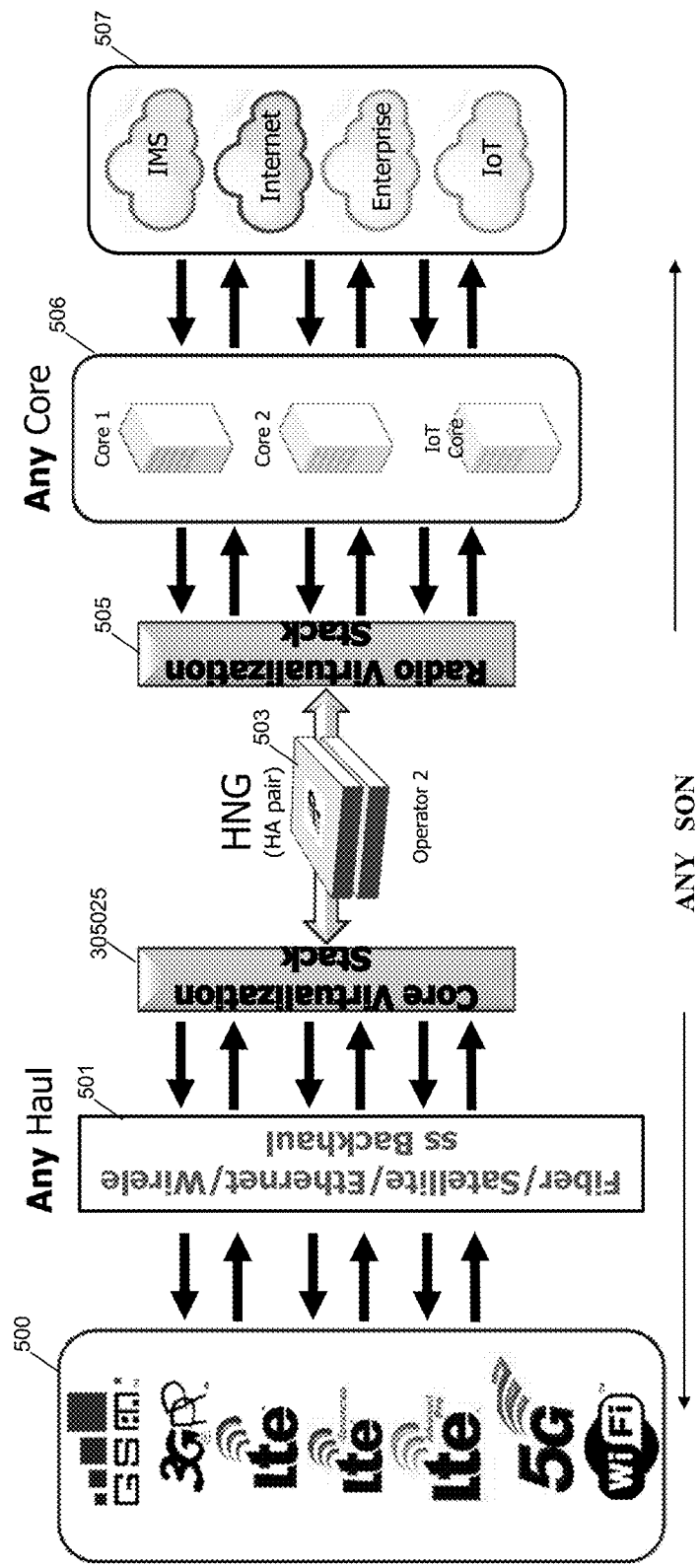
FIG. 5 is a diagram showing a 5G architecture, in accordance with some embodiments.

FIG. 5 shows a system having different RANs 500, any backhauls 501, a core virtualization stack 502, an HNG 503, a radio virtualization stack, any core network and destination/source device 506. The core virtualization stack serves as a core network proxy for communications between the RAN and the core network. Details regarding the core networks may be abstracted, translated, interworked, or otherwise changed, effectively virtualizing the core network to appear as a single, simplified core network to the RAN.

The radio virtualization stack 505 serves as a RAN proxy for communications to/from the core network to/from the RAN. Details regarding the RAN sites may be abstracted, translated, interworked, or otherwise changed, and complexity is hidden from the core network by proxying and translating all communications from the core network. This may include masking all base station physical cell identities, tracking area codes, and other base station identifying information. From the core networks point of view, all of the RAN sites appear as a single base station or eNodeB.

Figure 6:
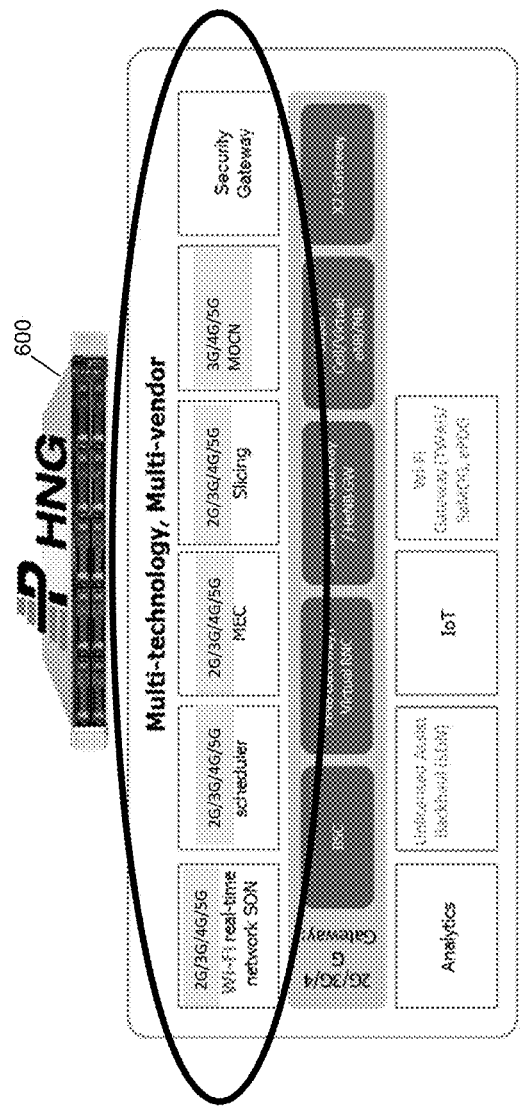
FIG. 6 is a diagram showing a HetNet Gateway (HNG), in accordance with some embodiments.

FIG. 6 shows an HNG 600 having 5G capabilities. The HNG includes a 2G/3G/4G/5G Wi-Fi real-time network SON, a 2G/3G/4G/5G scheduler, a 2G/3G/4G/5G MEC, 2G/3G/4G/5G slicing, a 3G/4G/5G MOCN and a security gateway.

Figure 7:
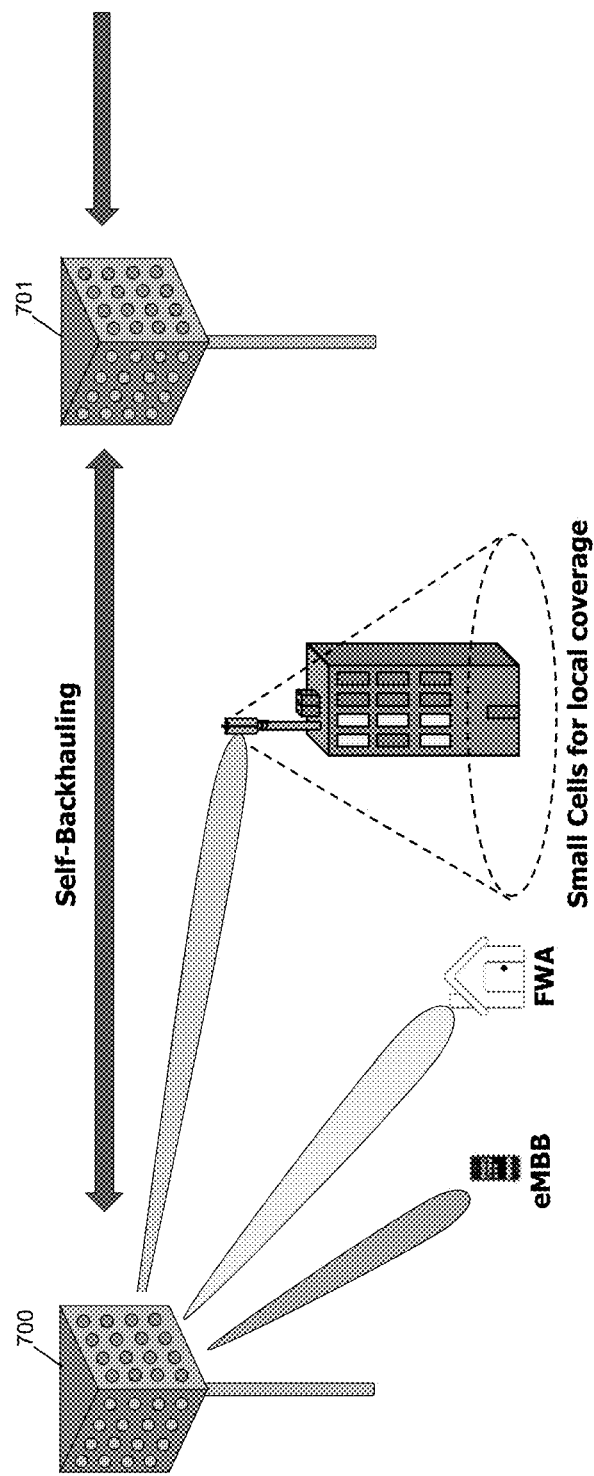
FIG. 7 is a diagram showing use cases for different technologies

FIG. 7 shows an example environment having a first MIMO 700 and a second MIMO 701. Self-backhauling (e.g. 5G mesh) between the first and second MIMO is supported, as is mobile broadband, fixed wireless access and small cells. Beamforming is used for the mobile broadband, fixed wireless access and small cells.

Figure 8:
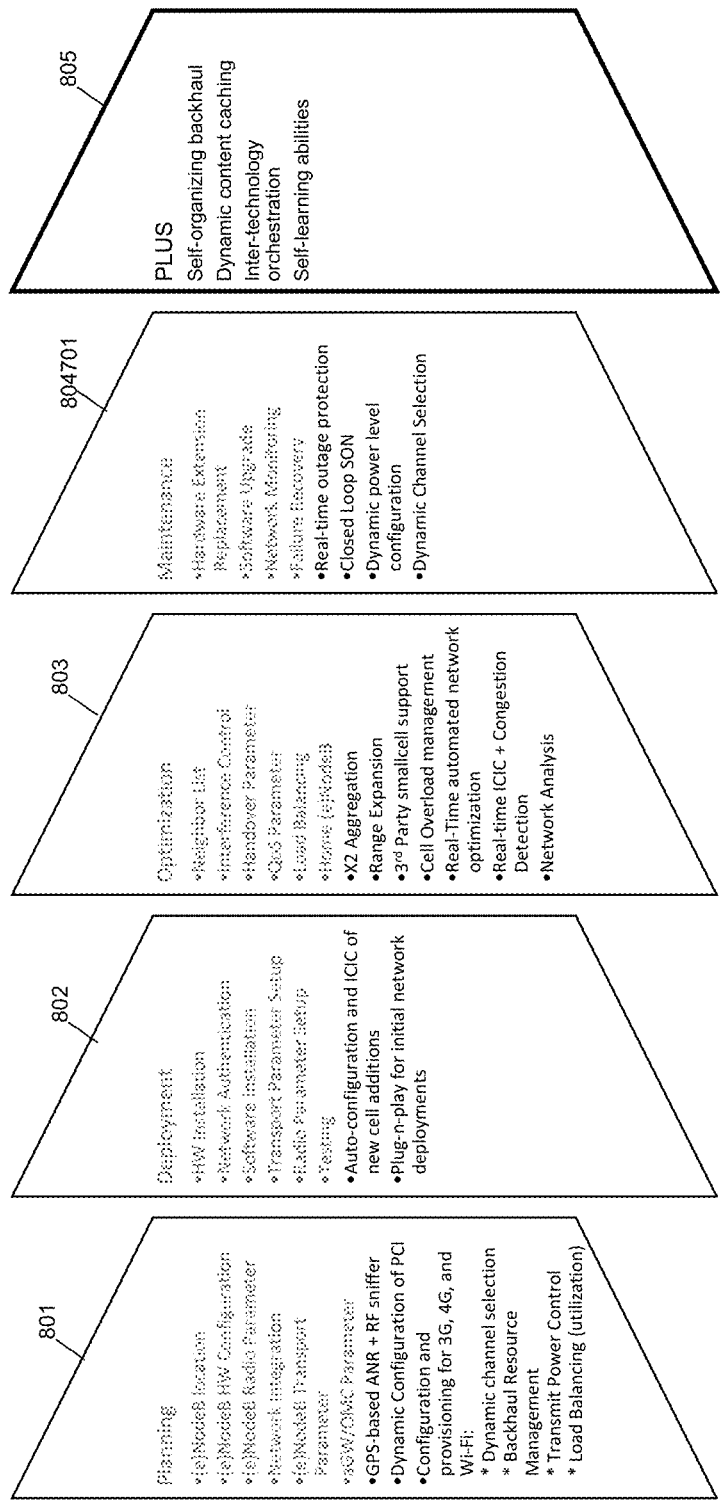
FIG. 8 is a diagram showing conventional and new features of the 5G interoperability architecture.

FIG. 8 shows standard features and new features provided as part of the 5G support. The planning feature 801 now includes GPS-based ANR+RF sniffer, dynamic configuration of PCI, configuration and provisioning for 3G, 4G, and Wi-Fi, dynamic channel selection, backhaul resource management, transmit power control, and load balancing. The deployment feature 802 now includes auto-configuration and ICIC of new cell additions and plug-n-play for initial network deployments. The optimization feature now includes X2 aggregation, range expansion, $3^{rd}$ party small-cell support, cell overload management, real-time automated network optimization, real-time ICIC+congestion detection, and network analysis. The maintenance feature includes real-time outage protection, closed loop SON, dynamic power level configuration and dynamic channel selection. Additional features include self-organizing backhaul, dynamic content caching, inter-technology orchestration, and self-learning abilities.

Figure 9B:
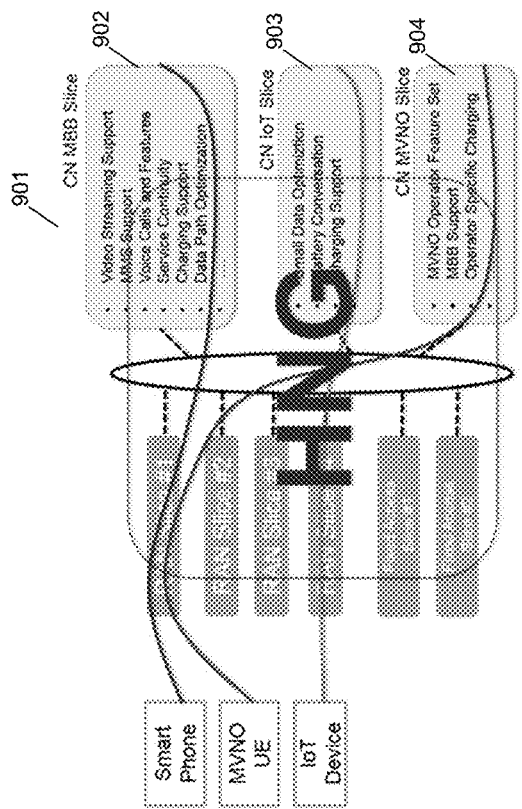
FIGS. 9A and 9B are diagrams showing a HetNet Gateway (HNG) enabling network slicing, in accordance with some embodiments.
Figure 9A:
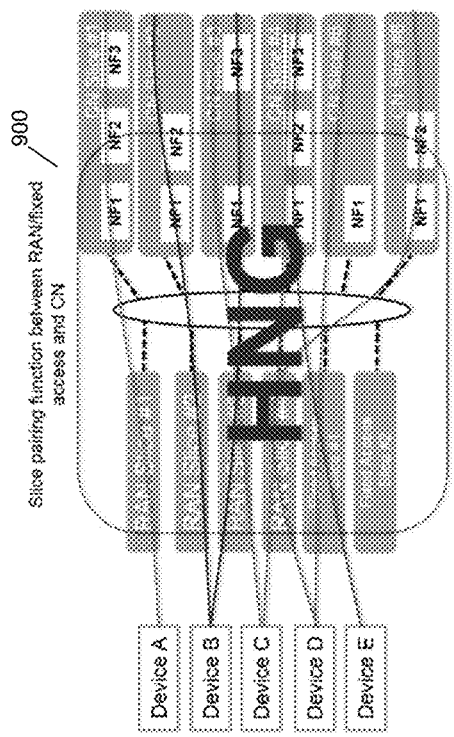

FIG. 9A shows the network slice pairing function between RAN/fixed access and CN. Network slicing permits flexible radio resource allocation among slices, the ability to scale easily with the addition of new slices, efficient use the radio and energy resources. The HNG NG enables this across any-G, any-haul, using slicing layer within HNG that is shared across Gs. Accordingly, 2G, 3G, 4G and 5G can benefit from end-to-end slicing. Different devices have one or more RAN slices which may connect with one or more CN slices. For example, device B utilizes RAN slice 2 and RAN slice 3, and CN slice 4 is part of the slice for device C and device E.

FIG. 9B shows different CN slice types. The CN slice types include CN MBB slice 902, CN IoT Slice 903, and CN MVNO slice 904. In one example, a smart phone and an MVNO UE share a RAN slice (RAN slice 1) and continue to different CN slices (smart phone to CN MBB slice, UE to CNMVNO slice).

Figure 10:
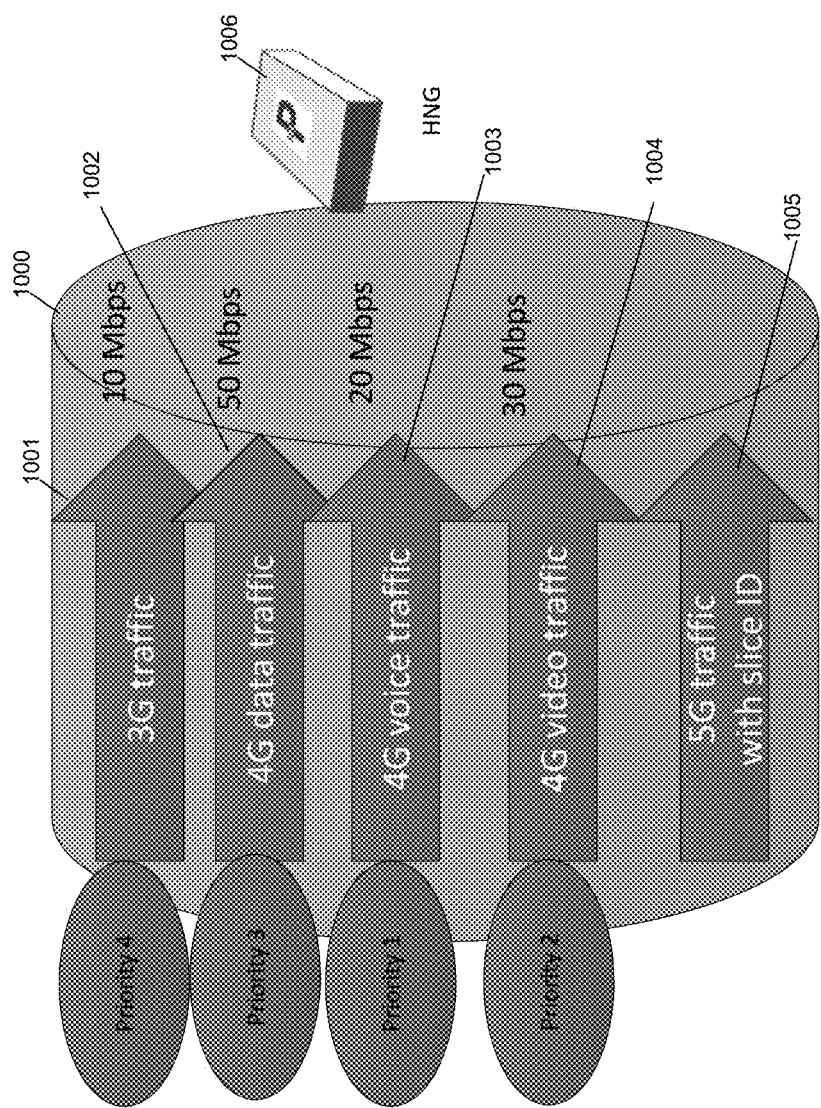
FIG. 10 is a diagram showing a Quality of Service (QoS) model enabled by HNG, in accordance with some embodiments.

FIG. 10 shows a QoS model enabled by the HNG. The model has a tunnel configuration 1000 wherein multiple tunnels are included. Tunnel 1001 is used for 3G traffic, tunnel 1002 is used for 4G data traffic, tunnel 1003 is used for 4G voice traffic, tunnel 1005 is used for 4G video traffic and tunnel 1005 is used for 5G traffic with slice ID. Tunnels 801-805 connect to HNG 806. The HNG allows to have multiple classes of service differentiates and prioritizes services—enabling granular Bandwidth Profile assignment and priority assignment per type of service and per end user and performance monitoring on a per user basis. Assignment change dynamically based on network condition. Suppose user A and User B, are on the same BS, and using data. A: 4G video; B: voice call. They are using the same backhaul but, since now A is watching video, A will get better QoS because data gets better priority. Except with CWS, it is based on the user, and so B will get good service too. This is user-driven. The HNG looks at the user and wants to give good service, not just per slice. Can balance 4G slices against 5G slices. Looking at data from user devices across Gs. We look at user information across Gs and across backhauls. Routing traffic to the other backhaul if one backhaul is loaded or offline. Look at backhaul information across Gs, and look at core information across Gs.

Figure 11:
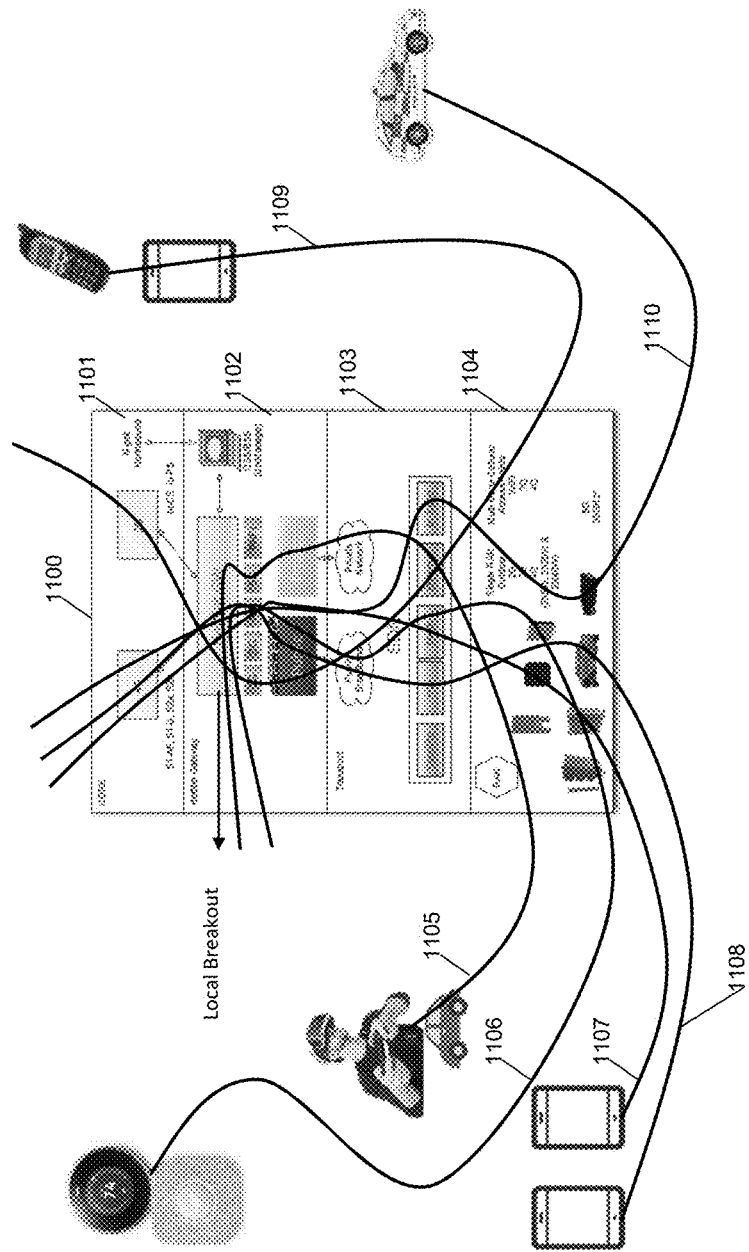
FIG. 11 is a diagram showing end to end network slicing using an HNG, in accordance with some embodiments.

FIG. 11 shows a network slicing example. The system 1100 includes a core 1101 which can include 2G, 3G and/or 4G cores. A HetNet Gateway (HNG) 1102 is in communication with the core 1101. The HNG 1102 includes 2G, 3G, 4G, 5G and Wi-Fi support. The HNG is providing a SON for any G. Transport 1103 is shown in communication with the HNG 1102. The transport 1103 can include public broadband and a private network. Transport 1103 also includes Software Defined Network (SDN) which decuples networking hardware from networking software. Also shown are RAN 1104 which includes multiple types of RANs in communication with transport 1103. System 1100 supports all Gs in the RAN and in the core. The system 1100 also supports any backhaul and any fronthaul, as well as any SON and any network slice.

In this example a VR user 1105 is part of a slice 1105 through the HNG. An IoT device is part of a slice 1106 extending from the IoT device through the HNG. UE device 1107 is part of network slice extending through the HNG and through the 4G core. UE device 1108 is part of network slice extending through the HNG and through the 4G core. Device 1109 is part of network slice extending through the HNG and through the 3G core. Police vehicle 1110 is part of network slice extending through the HNG and through the 4G core.

A 5G ready architecture can include both standalone (SA) and non-standalone (NSA) scenarios. A SA scenarios is 5G from end to end, using 5G cells for both signaling and information transfer. The SA scenario includes a 5G packet core architecture instead of relying on the 4G Evolved Packet core (EPC). This allows the deployment of 5G without using an LTE network. In an NSA scenario the 5G networks will be supported by existing 4G infrastructure. For example, 5G-enabled smartphones will connect to 5G frequencies for data-throughput improvements but will still use 4G for non-data duties such as talking to the cell towers and servers.

Figure 12:
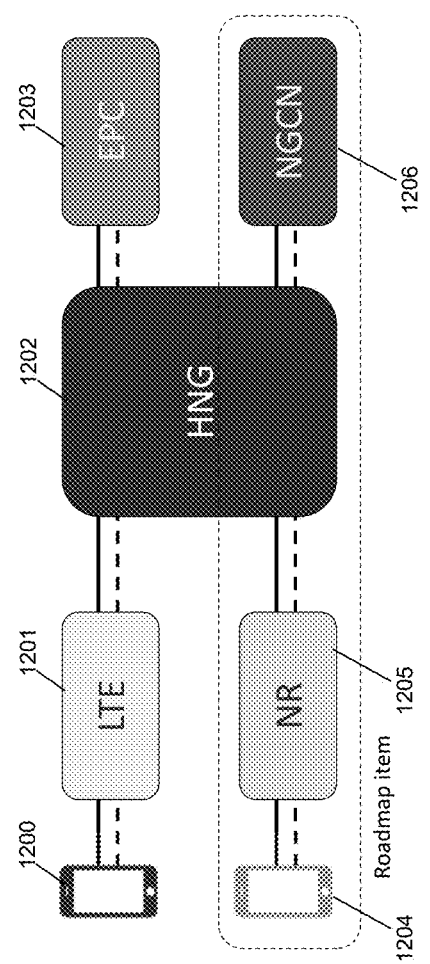
FIG. 12 is a diagram showing a 5G ready architecture, in accordance with some embodiments.

FIG. 12 is a block diagram of a 5G ready architecture. The architecture includes an LTE user equipment (UE) 1200 in communication with an LTE Radio Access Network (RAN) 1201 which is in communication with an HNG 1202. Also shown is an Evolved Packet Core (EPC) network 1203 in communication with the HNG 1202. A 5G UE 1210 is shown in communication with a Next Generation (NR, 5G) RAN which is also in communication with the HNG 1202. A Next Generation Core Network (NGCN, 5G) 1212 is in communication with the HNG 1202. The HNG is a virtualization node, and provides advanced RAN functions thereby simplifying LTE & NR. The HNG abstracts core functionality for EPC & NGCN thereby providing distributed core functionality. The HNG helps keep latency down and simplifies 5G deployment options for operators. The HNG will seamlessly work with all deployment options for 5G. The HNG speaks standard interfaces; interoperates with 5G radios; translates control plane; core and other radios exchange information with HNG because the HNG is a peer radio. The HNG can also provide multi-vendor translation.

Figure 13:
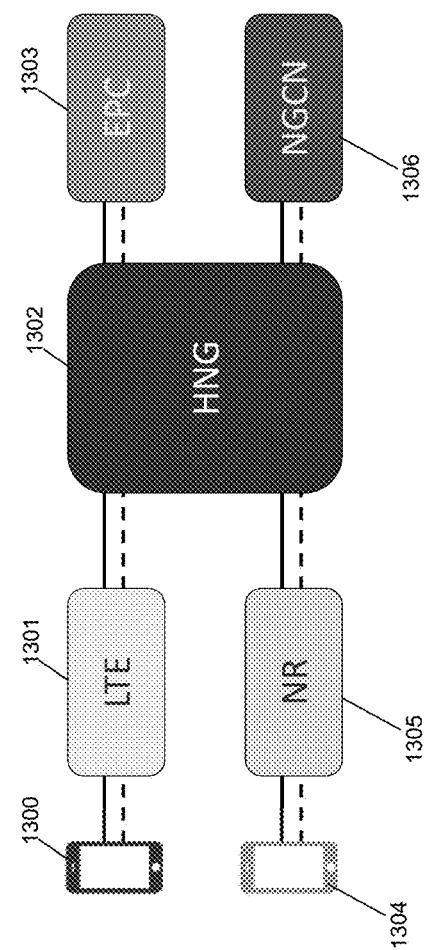
FIG. 13 is a diagram showing an example 3GPP 5G mapping solution, in accordance with some embodiments.

FIG. 13 is a block diagram of a 5G ready architecture. The architecture includes an LTE user equipment (UE) 1300 in communication with an LTE Radio Access Network (RAN) 1301 which is in communication with an HNG 1302. Also shown is an Evolved Packet Core (EPC) network 1303 in communication with the HNG 1302. A 5G UE 1304 is shown in communication with a Next Generation (NR, 5G) RAN 1305 which is also in communication with the HNG 1302. A Next Generation Core Network (NGCN, 5G) 1306 is in communication with the HNG 1002. The solid lines between LTE UE 1300, LTE 1301, HNG 1302 and EPC 1303 represent LTE user plane signaling. The dashed lines between LTE UE 1300, LTE 1301, HNG1102 and EPC 1303 represent LTE control plane signaling. The solid lines between UE 1304, NR 1305, HNG 1302 and NGCN 1306 1303 represent NR user plane signaling. The dashed lines between UE 1304, NR 1305, HNG 1302 and NGCN 1306 represent NR user control signaling.

The LTE UE 1300, LTE 1301, HNG1102 and EPC 1303 represent a standalone LTE and EPC connected network. The UE 1304, NR 1305, HNG1102 and NGCN 1306 1303 represent a standalone NR and NGC network.

Figure 14:
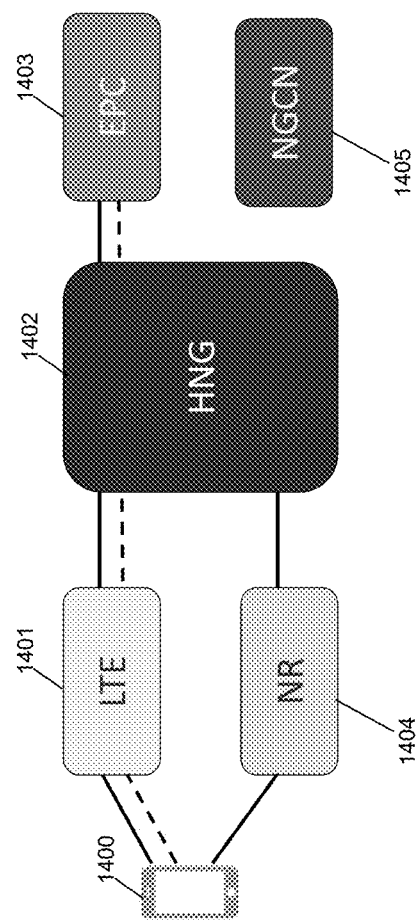
FIG. 14 is a diagram showing another example 3GPP 5G mapping solution, in accordance with some embodiments.

FIG. 14 shows an embodiment including a user equipment (UE) 1400 in communication with an LTE RAN 1401 which is in communication with an HNG 1402. Also shown is an EPC network 1403 in communication with the HNG 1402. Also shown is the UE 1400 in communication with a Next Generation (NR, 5G) RAN 1404 which is also in communication with the HNG 1402. The solid lines between LTE UE 1400, LTE 1401, HNG 1402 and EPC 1403 represent LTE user plane signaling. The dashed lines between UE 1400, LTE 1401, HNG 1402 and EPC 1403 represent LTE control plane signaling. The solid lines between UE 1400, NR 1404 and HNG 1402 represent NR user plane signaling. This embodiment represent a network only using an EPC core having both LTE and NR radio access.

Figure 15:
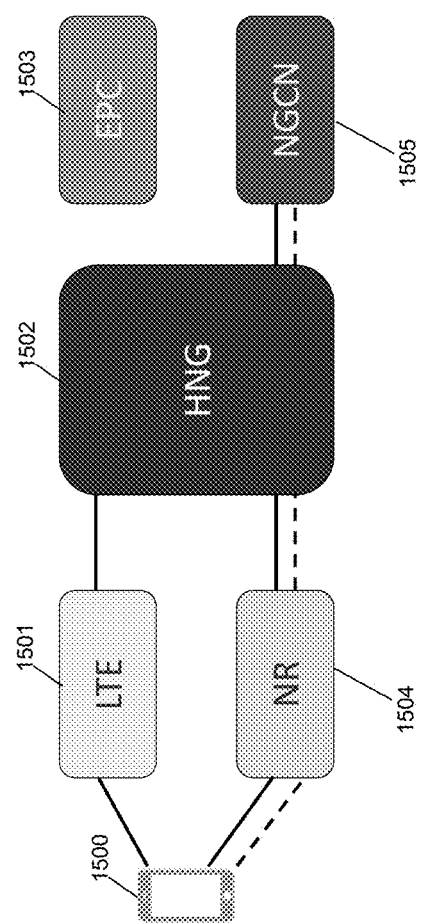
FIG. 15 is a diagram showing another example 3GPP 5G mapping solution, in accordance with some embodiments.

FIG. 15 shows an embodiment including a user equipment (UE) 1500 in communication with an LTE RAN 1501 which is in communication with an HNG 1502. Also shown is an EPC network 1503 in communication with the HNG 1502. Also shown is the UE 1500 in communication with a Next Generation (NR, 5G) RAN 1504 which is also in communication with the HNG 1502. Also shown is NGCN 1505 in communication with HNG 1502. The solid lines between UE 1500, LTE 1501, and HNG 1502 represent LTE user plane signaling. The solid lines between UE 1500, NR 1504, HNG 1502 and NGCN 1505 represent NR user plane signaling. The dashed lines between UE 1500, NR 1504 and HNG 1502 and NGCN 1505 represent NR control plane signaling. This embodiment represent a network only using an NG core having both LTE and NR radio access.

Figure 16:
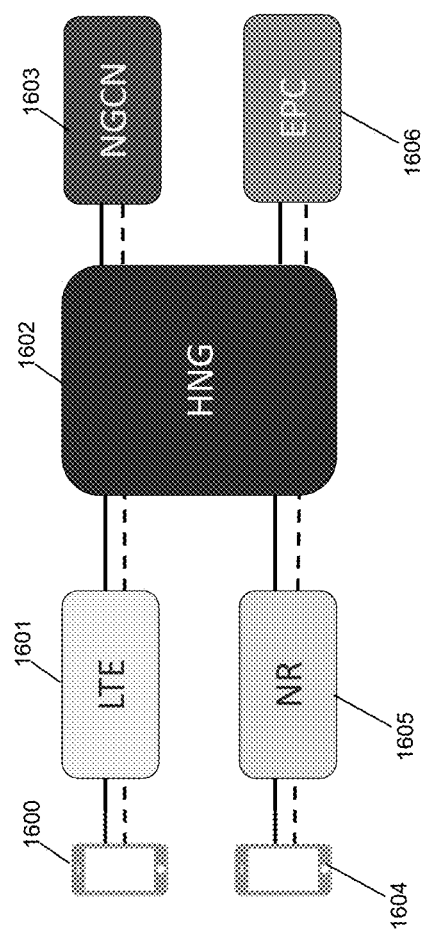
FIG. 16 is a diagram showing another example 3GPP 5G mapping solution, in accordance with some embodiments.

FIG. 16 shows an embodiment including a user equipment (UE) 1600 in communication with an LTE RAN 1601 which is in communication with an HNG 1602. Also shown is a NGCN network 1603 in communication with the HNG 1602. Also shown is a UE 1604 in communication with a Next Generation (NR, 5G) RAN 1605 which is also in communication with the HNG 1602. Also shown is EPC 1606 in communication with HNG 1302. The solid lines between UE 1600, LTE 1601, HNG 1602 and NGCN 1603 represent NR user plane signaling. The dashed lines between UE 1600, LTE 1601, HNG 1602 and NGCN 1603 represent NR control plane signaling. The solid lines between UE 1604, NR 1605 and HNG 1602 and EPC 1606 represent LTE user plane signaling. The dashed lines between UE 1604, NR 1605 and HNG 1602 and EPC 1606 represent LTE control plane signaling. This embodiment represent a network only using an NG core and using LTE access.

Figure 17:
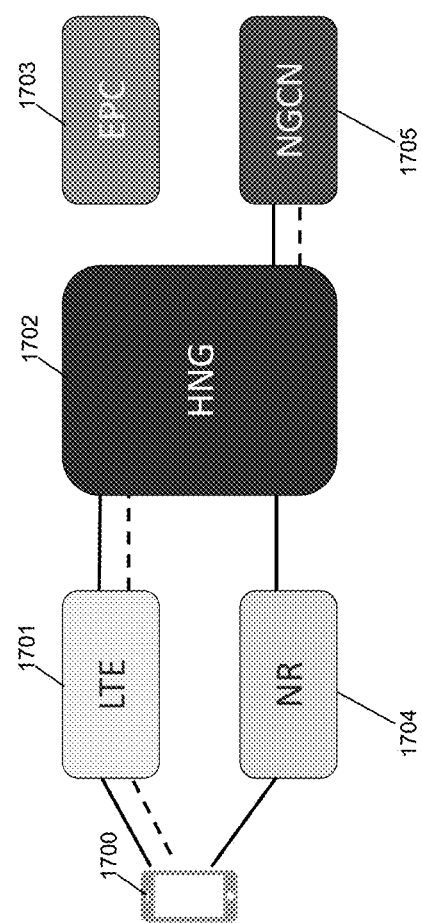
FIG. 17 is a diagram showing another example 3GPP 5G mapping solution, in accordance with some embodiments.

FIG. 17 shows an embodiment including a user equipment (UE) 1700 in communication with an LTE RAN 1701 which is in communication with an HNG 1702. Also shown is the UE 1700 in communication with a Next Generation (NR, 5G) RAN 1704 which is also in communication with the HNG 1702. Also shown is NGCN 1705 in communication with HNG 1702. The solid lines between UE 1700, LTE 1701, and HNG 1702 represent LTE user plane signaling. The dashed lines between UE 1700, LTE 1701, and HNG 1702 represent NR control plane signaling. The solid lines between UE 1700, NR 1704 and HNG 1702 and NGCN 1705 represent NR user plane signaling. The dashed lines between HNG 1702 and NGCN 1406 represent NR control plane signaling. This embodiment represent a network using an NG core and using both LTE NR access. The NG signaling is used, but is routed by the LTE RAN.

Figure 18:
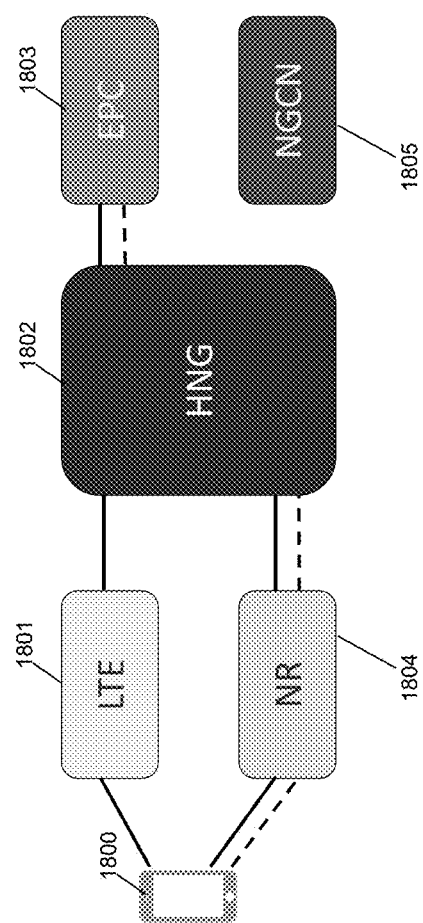
FIG. 18 is a diagram showing another example 3GPP 5G mapping solution, in accordance with some embodiments.

FIG. 18 shows an embodiment including a user equipment (UE) 1800 in communication with an LTE RAN 1801 which is in communication with an HNG 1802. Also shown is a EPC network 1803 in communication with the HNG 1802. Also shown is the UE 1800 in communication with a Next Generation (NR, 5G) RAN 1804 which is also in communication with the HNG 1802. The solid lines between UE 1800, LTE 1801, HNG 1802 and EPC 1803 represent LTE user plane signaling. The dashed line between HNG 1802 and EPC 1803 represents LTE control plane signaling. The solid lines between UE 1800, NR 1804 and HNG 1802 represent NR user plane signaling. The dashed lines between UE 1800, NR 1804 and HNG 1802 represent LTE control plane signaling. This embodiment represent a network only using an EPC core and using LTE and NR access. Control signaling is routed through the NR RAN.

Figure 19:
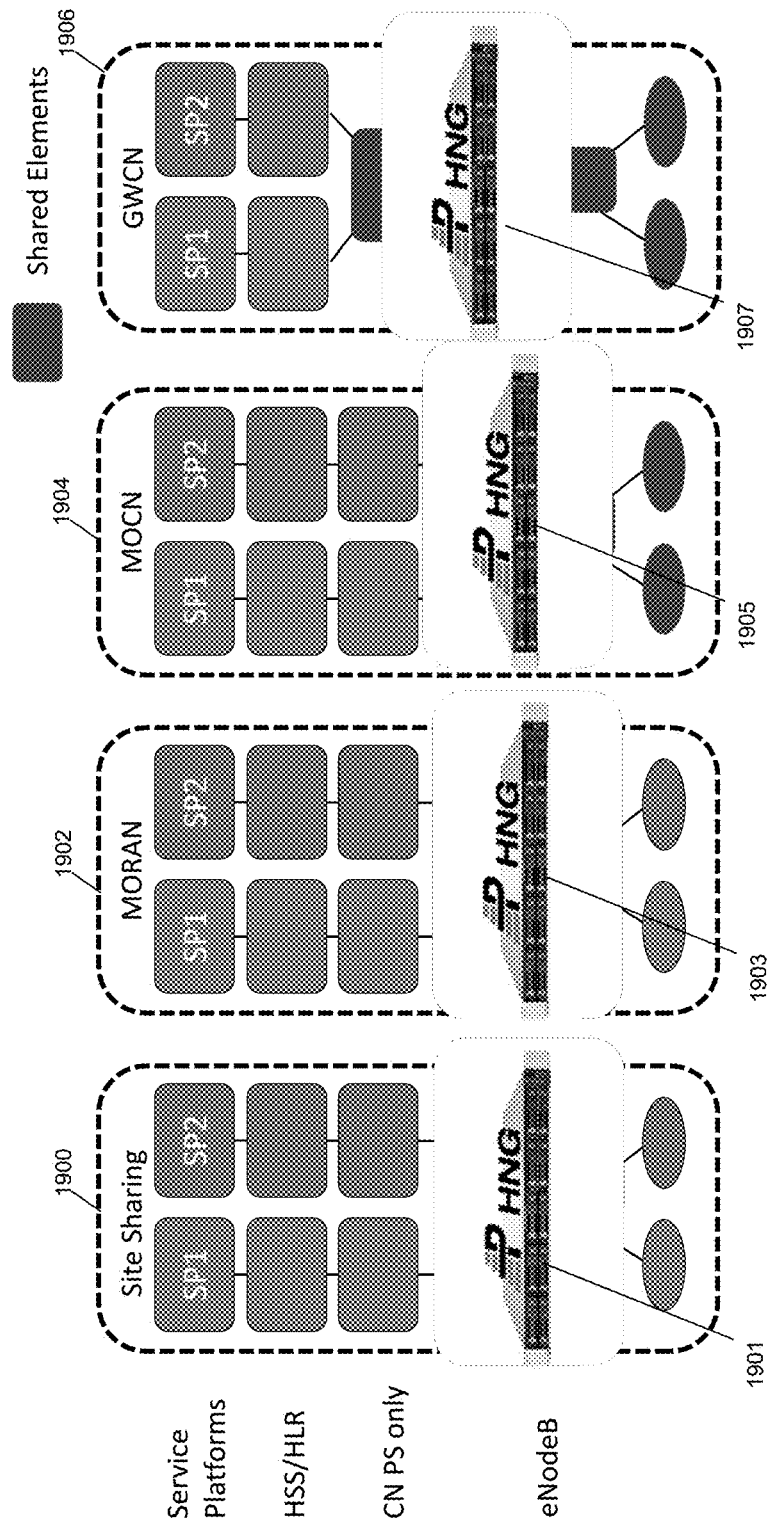
FIG. 19 is a diagram showing a site sharing, MORAN, MOCN and GWCN, in accordance with some embodiments.

FIG. 19 is a diagram showing site sharing 1900, MORAN 1902, MOCN 1904 and GWCN 1906. The HNG 1901 provides the sharing for the site sharing, HNG 1903 provides the sharing for MORAN 1902, HNG 1905 provides the sharing for MOCN and HNG 1907 provides the sharing form GWCN. In the MOCN the shared elements are the cell/frequency. In the GWCN, the cell/frequency and the eNodeB are shared.

Figure 20:
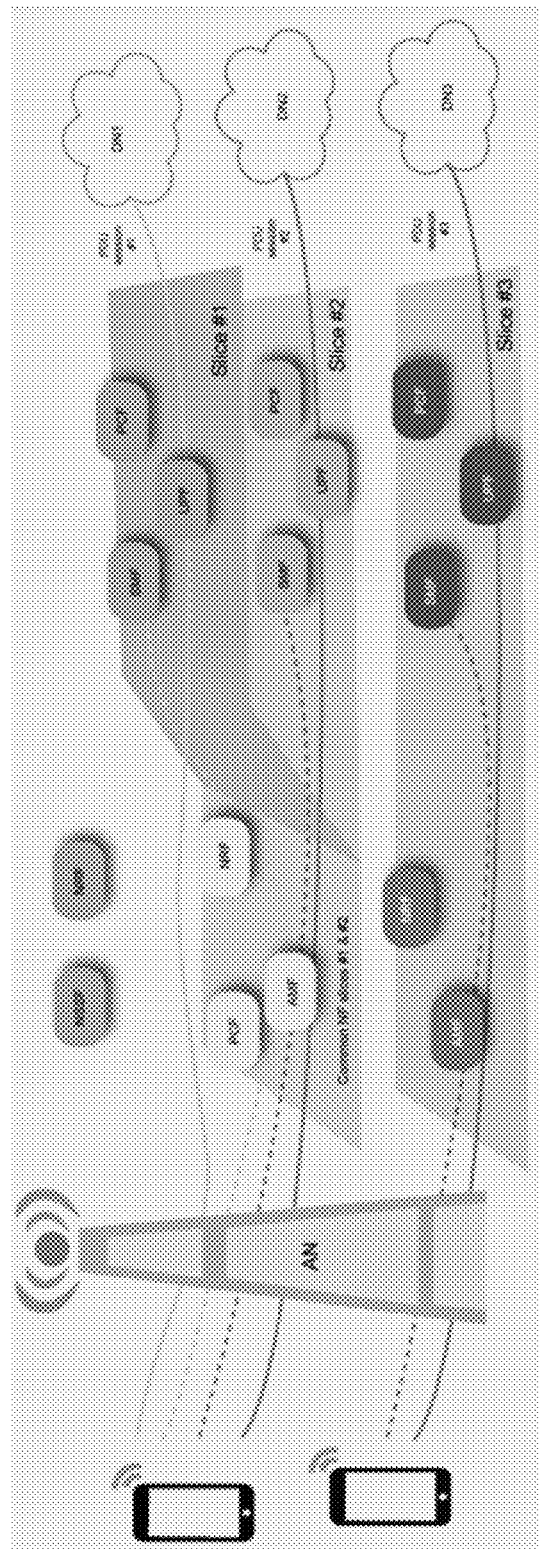
FIG. 20 is a diagram showing 5G network slicing, in accordance with some embodiments.

FIG. 20 is a diagram showing different slices of a slice sharing scenario. Different control plane and data plane flows are shown for each slice.

Figure 21:
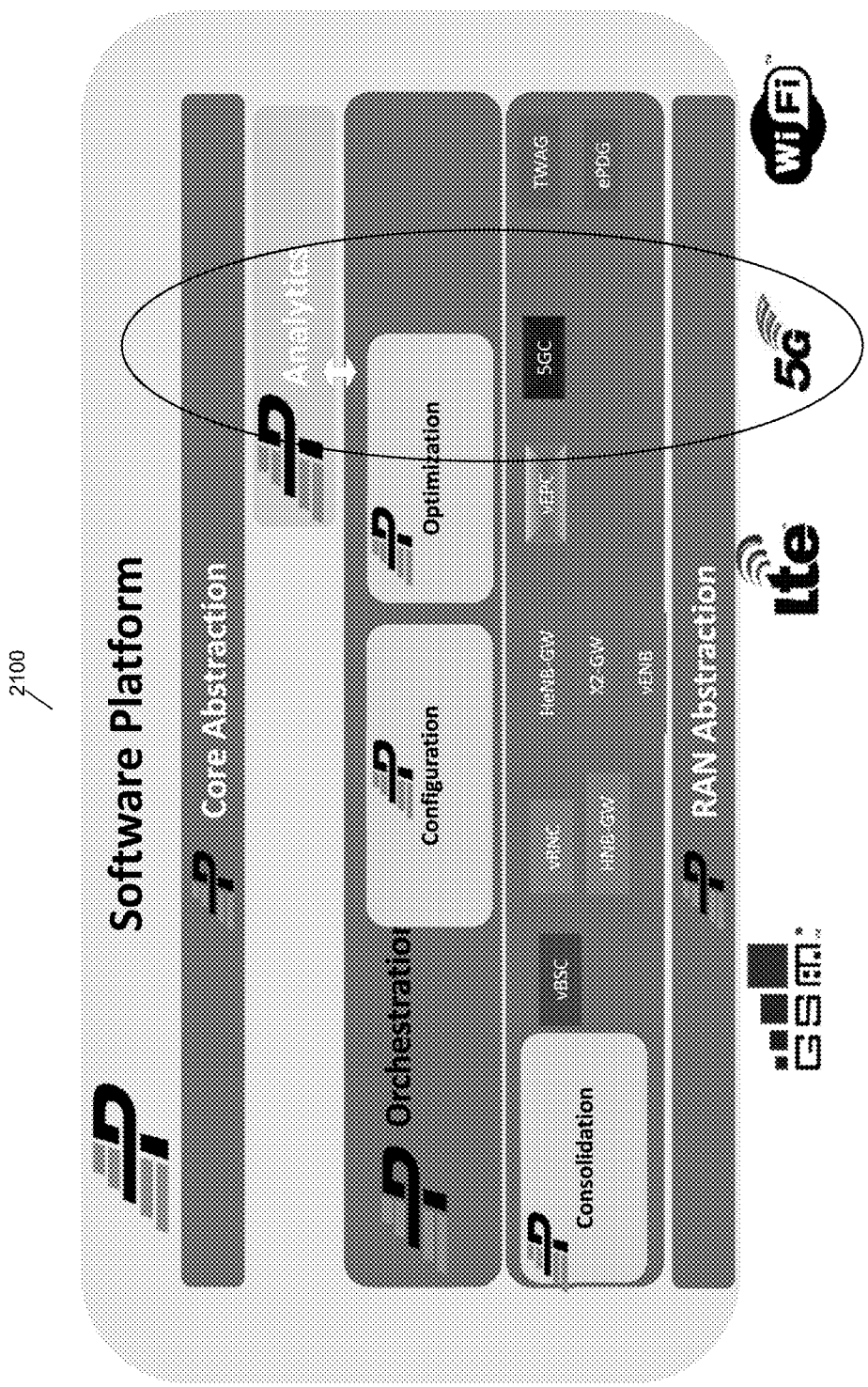
FIG. 21 is a diagram of an all G software platform, in accordance with some embodiments.

FIG. 21 is a block diagram showing the software platform 2100. Shown are the 2G (vBSC), 3G (vRNC, HNB-GW), 4G (HeNB, X2-GW, vENB and 4C), all core (vEPC) and 5G core standalone (5GC).

Figure 22:
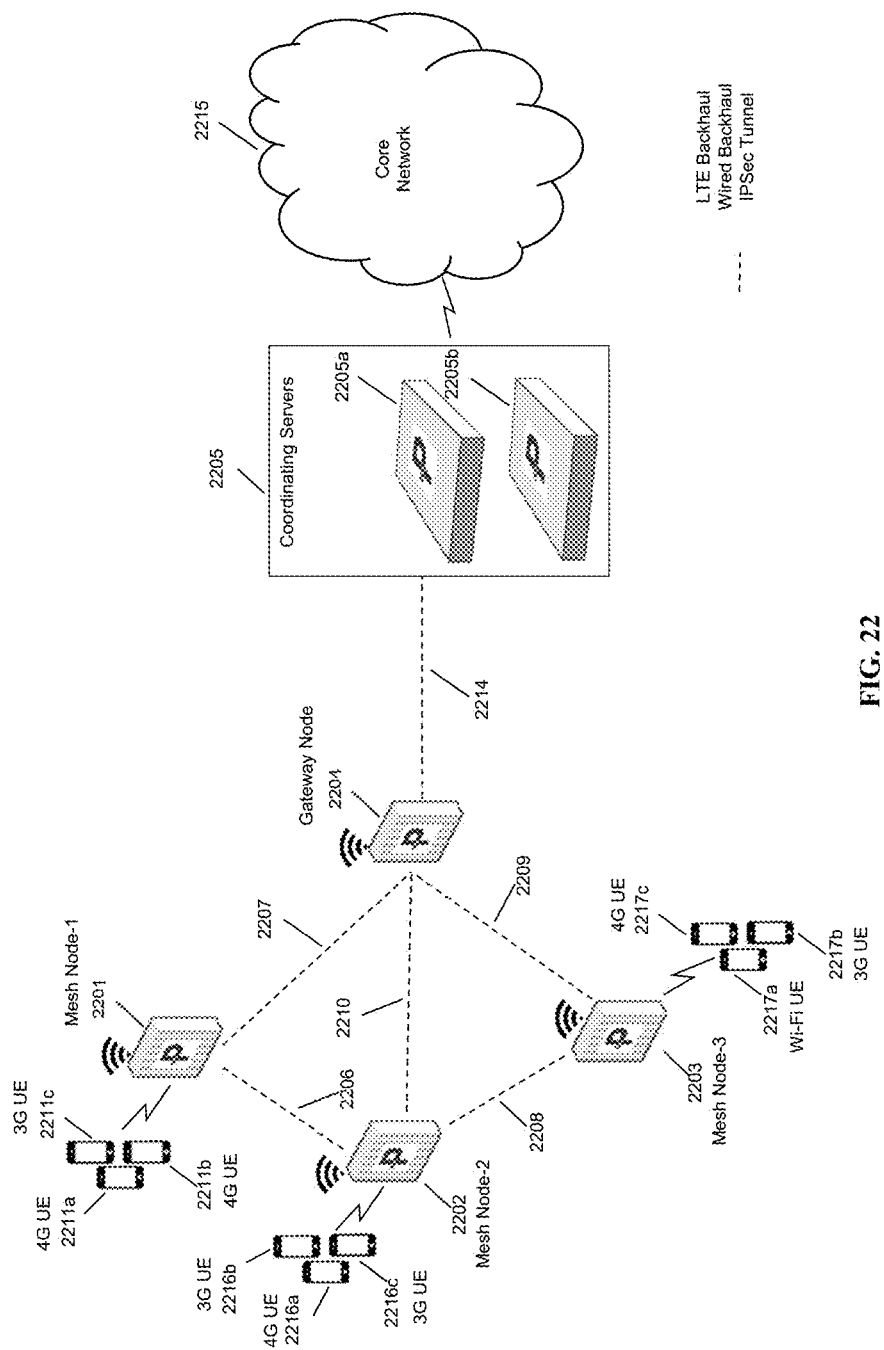
FIG. 22 is a diagram of a network utilizing any G RAN nodes and any G core nodes, in accordance with some embodiments.

FIG. 22 is a network diagram in accordance with some embodiments. In some embodiments, as shown in FIG. 22, a mesh node 1 2201, a mesh node 2 2202, and a mesh node 3 2203 are any G RAN nodes. Base stations 2201, 2202, and 2203 form a mesh network establishing mesh network links 2206, 2207, 2208, 2209, and 2210 with a base station 2204. The mesh network links are flexible and are used by the mesh nodes to route traffic around congestion within the mesh network as needed. The base station 2204 acts as gateway node or mesh gateway node, and provides backhaul connectivity to a core network to the base stations 101, 2202, and 2203 over backhaul link 2214 to a coordinating server(s) 2205 and towards core network 2215. The Base stations 2201, 2202, 2203, 2204 may also provide eNodeB, NodeB, Wi-Fi Access Point, Femto Base Station etc. functionality, and may support radio access technologies such as 2G, 3G, 4G, 5G, Wi-Fi etc. The base stations 2201, 2202, 2203 may also be known as mesh network nodes 2201, 2202, 2203.

The coordinating servers 2205 are shown as two coordinating servers 2205a and 2205b. The coordinating servers 2205a and 2205b may be in load-sharing mode or may be in active-standby mode for high availability. The coordinating servers 2205 may be located between a radio access network (RAN) and the core network and may appear as core network to the base stations in a radio access network (RAN) and a single eNodeB to the core network, i.e., may provide virtualization of the base stations towards the core network. As shown in FIG. 22, various user equipments 2211a, 2211b, 2211c are connected to the base station 2201. The base station 2201 provides backhaul connectivity to the user equipments 2211a, 2211b, and 2211c connected to it over mesh network links 2206, 2207, 2208, 2209, 2210 and 2214. The user equipments may be mobile devices, mobile phones, personal digital assistant (PDA), tablet, laptop etc. The base station 2202 provides backhaul connection to user equipments 2212a, 2212b, 2212c and the base station 2203 provides backhaul connection to user equipments 2213a, 2213b, and 2213c. The user equipments 2211a, 2211b, 2211c, 2212a, 2212b, 2212c, 2213a, 2213b, 2213c may support any radio access technology such as 2G, 3G, 4G, 5G, Wi-Fi, WiMAX, LTE, LTE-Advanced etc. supported by the mesh network base stations, and may interwork these technologies to IP.

In some embodiments, depending on the user activity occurring at the user equipments 2211a, 2211b, 2211c, 2212a, 2212b, 2212c, 2213a, 2213b, and 2213c, the uplink 2214 may get congested under certain circumstances. As described above, to continue the radio access network running and providing services to the user equipments, the solution requires prioritizing or classifying the traffic based at the base stations 2201, 2202, 2203. The traffic from the base stations 2201, 2202, and 2203 to the core network 2215 through the coordinating server 2205 flows through an IPSec tunnel terminated at the coordinating server 2205. The mesh network nodes 2201, 2202, and 2203 adds IP Option header field to the outermost IP Header (i.e., not to the pre-encapsulated packets). The traffic may from the base station 2201 may follow any of the mesh network link path such as 2207, 2206-110, 2206-108-109 to reach to the mesh gateway node 2204, according to a mesh network routing protocol.

Figure 23:
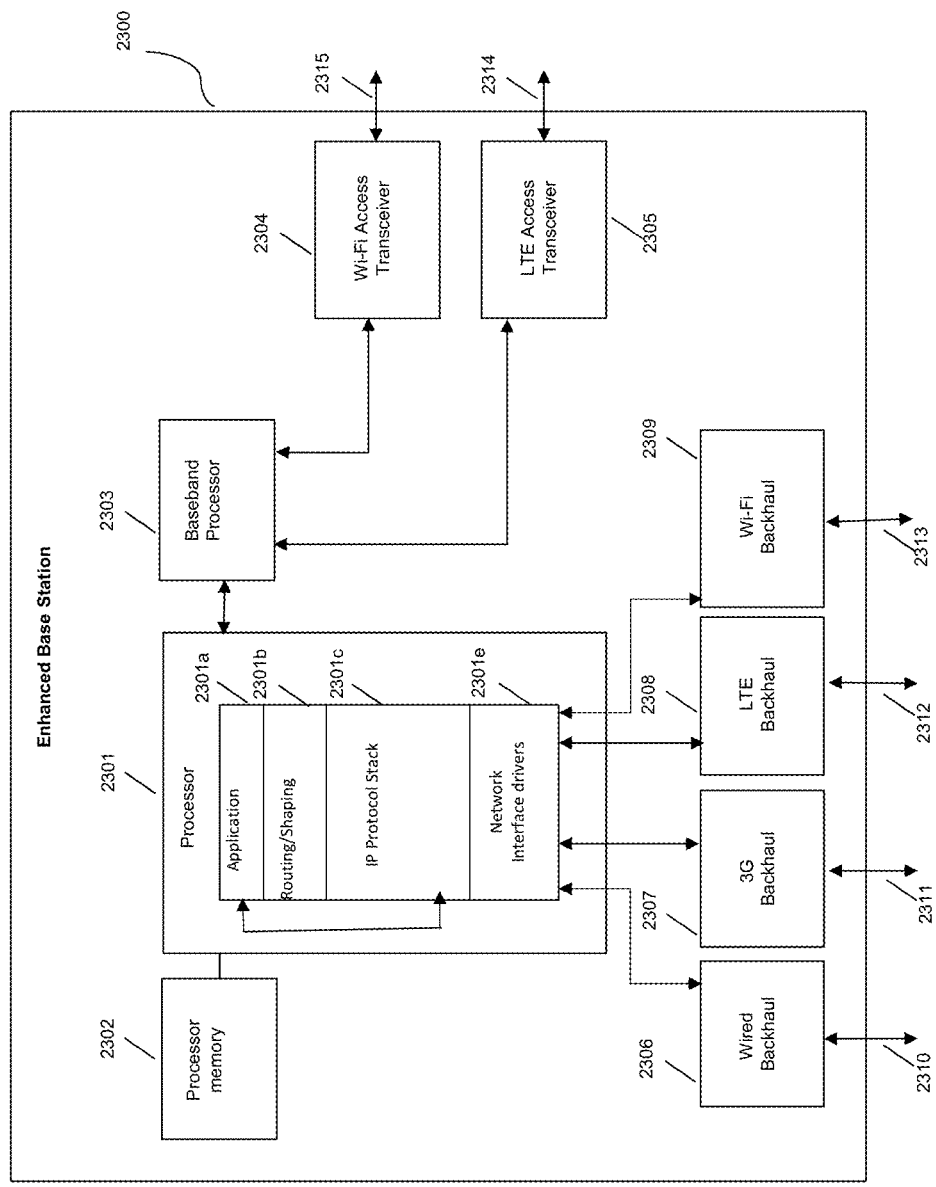
FIG. 23 is an enhanced eNodeB for performing the methods described herein, in accordance with some embodiments.

FIG. 23 is an enhanced eNodeB for performing the methods described herein, in accordance with some embodiments. Mesh network node 2300 may include processor 2302, processor memory 2304 in communication with the processor, baseband processor 2306, and baseband processor memory 2308 in communication with the baseband processor. Mesh network node 2300 may also include first radio transceiver 2312 and second radio transceiver 2314, internal universal serial bus (USB) port 2316, and subscriber information module card (SIM card) 2318 coupled to USB port 2316. In some embodiments, the second radio transceiver 2314 itself may be coupled to USB port 2316, and communications from the baseband processor may be passed through USB port 2316. The second radio transceiver may be used for wirelessly backhauling eNodeB 2300.

Processor 2302 and baseband processor 2306 are in communication with one another. Processor 2302 may perform routing functions, and may determine if/when a switch in network configuration is needed. Baseband processor 2306 may generate and receive radio signals for both radio transceivers 2312 and 2314, based on instructions from processor 2302. In some embodiments, processors 2302 and 2306 may be on the same physical logic board. In other embodiments, they may be on separate logic boards.

Processor 2302 may identify the appropriate network configuration, and may perform routing of packets from one network interface to another accordingly. Processor 2302 may use memory 2304, in particular to store a routing table to be used for routing packets. Baseband processor 2306 may perform operations to generate the radio frequency signals for transmission or retransmission by both transceivers 2310 and 2312. Baseband processor 2306 may also perform operations to decode signals received by transceivers 2312 and 2314. Baseband processor 2306 may use memory 2308 to perform these tasks.

The first radio transceiver 2312 may be a radio transceiver capable of providing LTE eNodeB functionality, and may be capable of higher power and multi-channel OFDMA. The second radio transceiver 2314 may be a radio transceiver capable of providing LTE UE functionality. Both transceivers 2312 and 2314 may be capable of receiving and transmitting on one or more LTE bands. In some embodiments, either or both of transceivers 2312 and 2314 may be capable of providing both LTE eNodeB and LTE UE functionality. Transceiver 2312 may be coupled to processor 2302 via a Peripheral Component Interconnect-Express (PCI-E) bus, and/or via a daughtercard. As transceiver 2314 is for providing LTE UE functionality, in effect emulating a user equipment, it may be connected via the same or different PCI-E bus, or by a USB bus, and may also be coupled to SIM card 2318. First transceiver 2312 may be coupled to first radio frequency (RF) chain (filter, amplifier, antenna) 2322, and second transceiver 2314 may be coupled to second RF chain (filter, amplifier, antenna) 2324.

SIM card 2318 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 2300 is not an ordinary UE but instead is a special UE for providing backhaul to device 2300.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 2312 and 2314, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 2302 for reconfiguration.

A GPS module 2330 may also be included, and may be in communication with a GPS antenna 2332 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 2332 may also be present and may run on processor 2302 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

Figure 24:
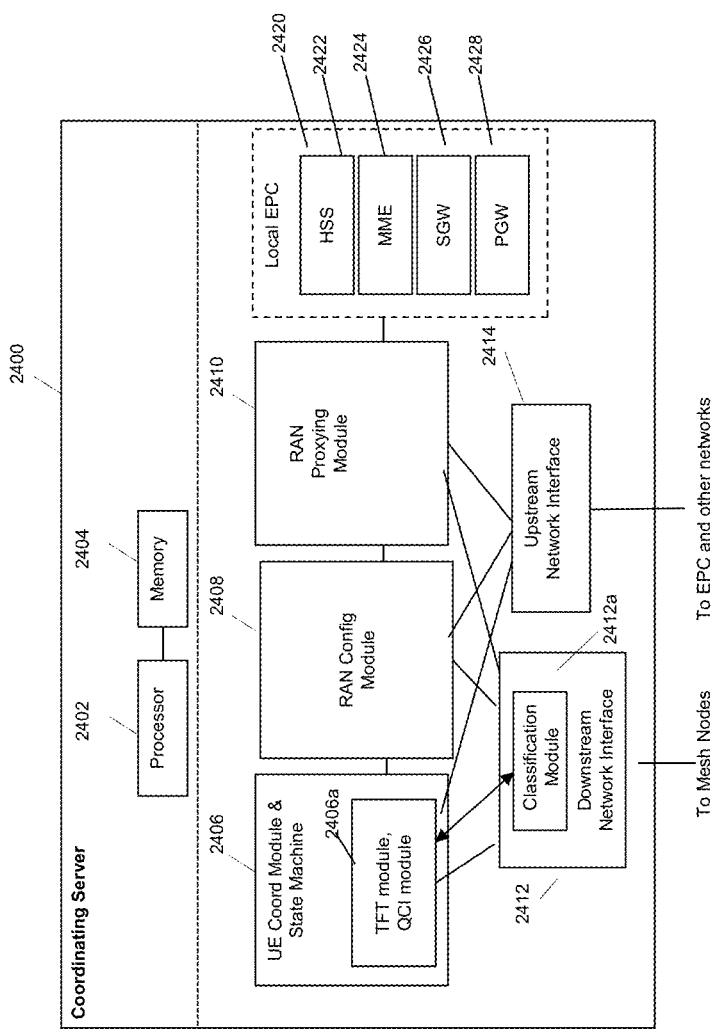
FIG. 24 is a coordinating server for providing services and performing methods as described herein, in accordance with some embodiments.

FIG. 24 is a coordinating server for providing services and performing methods as described herein, in accordance with some embodiments. Coordinating server 2400 includes processor 2402 and memory 2404, which are configured to provide the functions described herein. Also present are radio access network coordination/routing (RAN Coordination and routing) module 2406, including ANR module 2406a, RAN configuration module 2408, and RAN proxying module 2410. The ANR module 2406a may perform the ANR tracking, PCI disambiguation, ECGI requesting, and GPS coalescing and tracking as described herein, in coordination with RAN coordination module 2406 (e.g., for requesting ECGIs, etc.). In some embodiments, coordinating server 2400 may coordinate multiple RANs using coordination module 2406. In some embodiments, coordination server may also provide proxying, routing virtualization and RAN virtualization, via modules 2410 and 2408. In some embodiments, a downstream network interface 2412 is provided for interfacing with the RANs, which may be a radio interface (e.g., LTE), and an upstream network interface 2414 is provided for interfacing with the core network, which may be either a radio interface (e.g., LTE) or a wired interface (e.g., Ethernet).

Coordinator 2400 includes local evolved packet core (EPC) module 2420, for authenticating users, storing and caching priority profile information, and performing other EPC-dependent functions when no backhaul link is available. Local EPC 2420 may include local HSS 2422, local MME 2424, local SGW 2426, and local PGW 2428, as well as other modules. Local EPC 2420 may incorporate these modules as software modules, processes, or containers. Local EPC 2420 may alternatively incorporate these modules as a small number of monolithic software processes. Modules 2406, 2408, 2410 and local EPC 2420 may each run on processor 2402 or on another processor, or may be located within another device.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof.

The word "cell" is used herein to denote either the coverage area of any base station, or the base station itself, as appropriate and as would be understood by one having skill in the art. For purposes of the present disclosure, while actual PCIs and ECGIs have values that reflect the public land mobile networks (PLMNs) that the base stations are part of, the values are illustrative and do not reflect any PLMNs nor the actual structure of PCI and ECGI values.

In the above disclosure, it is noted that the terms PCI conflict, PCI confusion, and PCI ambiguity are used to refer to the same or similar concepts and situations, and should be understood to refer to substantially the same situation, in some embodiments. In the above disclosure, it is noted that PCI confusion detection refers to a concept separate from PCI disambiguation, and should be read separately in relation to some embodiments. Power level, as referred to above, may refer to RSSI, RSFP, or any other signal strength indication or parameter.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, legacy TDD, or other air interfaces used for mobile telephony.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A gateway comprising:
   a Radio Access Network (RAN) interface for communicating with the at least one RAN;
   a core network interface for communicating with the at least one core network; and
   a processor in communication with the RAN interface and the core network interface, the processor configured to:
   process 4G signaling received from the at least one RAN on the RAN interface and provide 5G core signaling to at least one core network; and
   process 5G signaling received from the at least one core on the core network interface and provide 4G RAN signaling to the at least one RAN,
   wherein the core network is a 5G core network.

2. The gateway of claim 1, wherein the processor is further configured to:
   process 5G signaling received from the at least one RAN on the RAN interface and provide 5G core signaling to a 5G core; and process signaling received from a 5G core on the core network interface and provide 5G RAN signaling to at least one RAN.

3. The gateway of claim 1, wherein the processor is further configured to:
process signaling received from the at least one RAN on the RAN interface and provide core signaling to a core; and
process signaling received from a core on the core network interface and provide RAN signaling to at least one RAN.

4. The gateway of claim 1, wherein the processor is further configured to provide network slicing, enabling building of multiple logical networks for different services across any of the at least one RAN and any of the at least one core.

5. A system configured to provide 5G interoperability, comprising:
at least one Radio Access network (RAN);
at least one core network; and
a gateway in communication with the RAN and the core network, the gateway including:
a Radio Access Network (RAN) interface for communicating with the at least one RAN;
a core network interface for communicating with the at least one core network; and
a processor configured to:
process 4G signaling received from the at least one RAN on the RAN interface and provide 5G core signaling to at least one core network; and
process 5G signaling received from the at least one core on the core network interface and provide 4G RAN signaling to the at least one RAN,
wherein the core network is a 5G core network.

6. The system of claim 5, wherein one of the at least one core is an Evolved Packet Core (EPC), wherein one of the at least one RAN is an LTE RAN, and wherein the signaling includes user plane signaling and control plane signaling between the EPC and the LTE RAN.

7. The system of claim 5, wherein one of the at least one core is a 5G core, wherein one of the at least one RAN is a 5G RAN, and wherein the core signaling and the RAN signaling includes 5G user plane signaling and 5G control plane signaling.

8. The system of claim 5, wherein one of the at least one core is an Evolved Packet Core (EPC), wherein the at least one RAN is a 5G RAN and an LTE RAN, wherein the signaling includes user plane signaling between the EPC and the 5G RAN, and wherein the signaling includes user plane signaling and control plane signaling between the EPC and the LTE RAN.

9. The system of claim 5, wherein one of the at least one core is a 5G core and wherein the at least one RAN is a 5G RAN and an LTE RAN, wherein the signaling includes user plane signaling between the 5G core and the LTE RAN, and wherein the signaling includes user plane signaling and control plane signaling between the 5G core and the 5G RAN.

10. The system of claim 5, wherein one of the at least one core is a 5G core and wherein one of the at least one RAN is an LTE RAN and wherein the signaling includes user plane signaling and control plane signaling between the 5G core and the LTE RAN.

11. The system of claim 5, wherein one of the at least one core is an Evolved Packet Core (EPC) core and wherein one of the at least one RAN is a 5G RAN, and wherein the signaling includes user plane signaling and control plane signaling between the EPC core and the 5G RAN.

12. The system of claim 5, wherein one of the at least one core is a 5G core and wherein the at least one RAN is at least one of a 5G RAN and an LTE RAN, and wherein the signaling includes user plane signaling between the 5G core and the 5G RAN, and wherein the signaling includes user plane signaling and control plane signaling between the 5G core and the LTE RAN.

13. The system of claim 5, wherein one of the at least one core is an EPC core and wherein the at least one RAN is at least one of a 5G RAN and an LTE RAN, and wherein the signaling includes user plane signaling between the EPC core and the LTE RAN, and wherein the signaling includes user plane signaling and control plane signaling between the EPC core and the 5G RAN.

14. The system of claim 5, wherein the gateway is further configured to provide network slicing, enabling building of multiple logical networks for different services across any of the at least one RAN and any of the at least one core network.

15. A method for providing 5G interoperability, comprising:
providing a gateway having a Radio Access Network (RAN) interface for communicating with the at least one RAN, a core network interface for communicating with the at least one core network, and a processor;
processing, by the processor, 4G signaling received from the at least one RAN on the RAN interface and providing 5G core signaling to at least one core network; and
processing, by the processor, 5G signaling received from the at least one core
on the core network interface and providing 4G RAN signaling to the at least one RAN, wherein the core network is a 5G core network.

16. The method of claim 15, further comprising:
processing, by the processor 5G signaling received from the at least one RAN on the RAN interface and providing 5G core signaling to a 5G core; and
processing, by the processor, signaling received from a 5G core on the core network interface and providing 5G RAN signaling to at least one RAN.

17. The method of claim 15, further comprising:
processing, by the processor, signaling received from the at least one RAN on the RAN interface and providing core signaling to a core; and
processing, by the processor, signaling received from a core on the core network interface and providing RAN signaling to at least one RAN.

18. The method of claim 15, further comprising providing network slicing, enabling building of multiple logical networks for different services across any of the at least one RAN and any of the at least one core network.

* * * * *